United States Patent Office 2,804,150
Patented Aug. 27, 1957

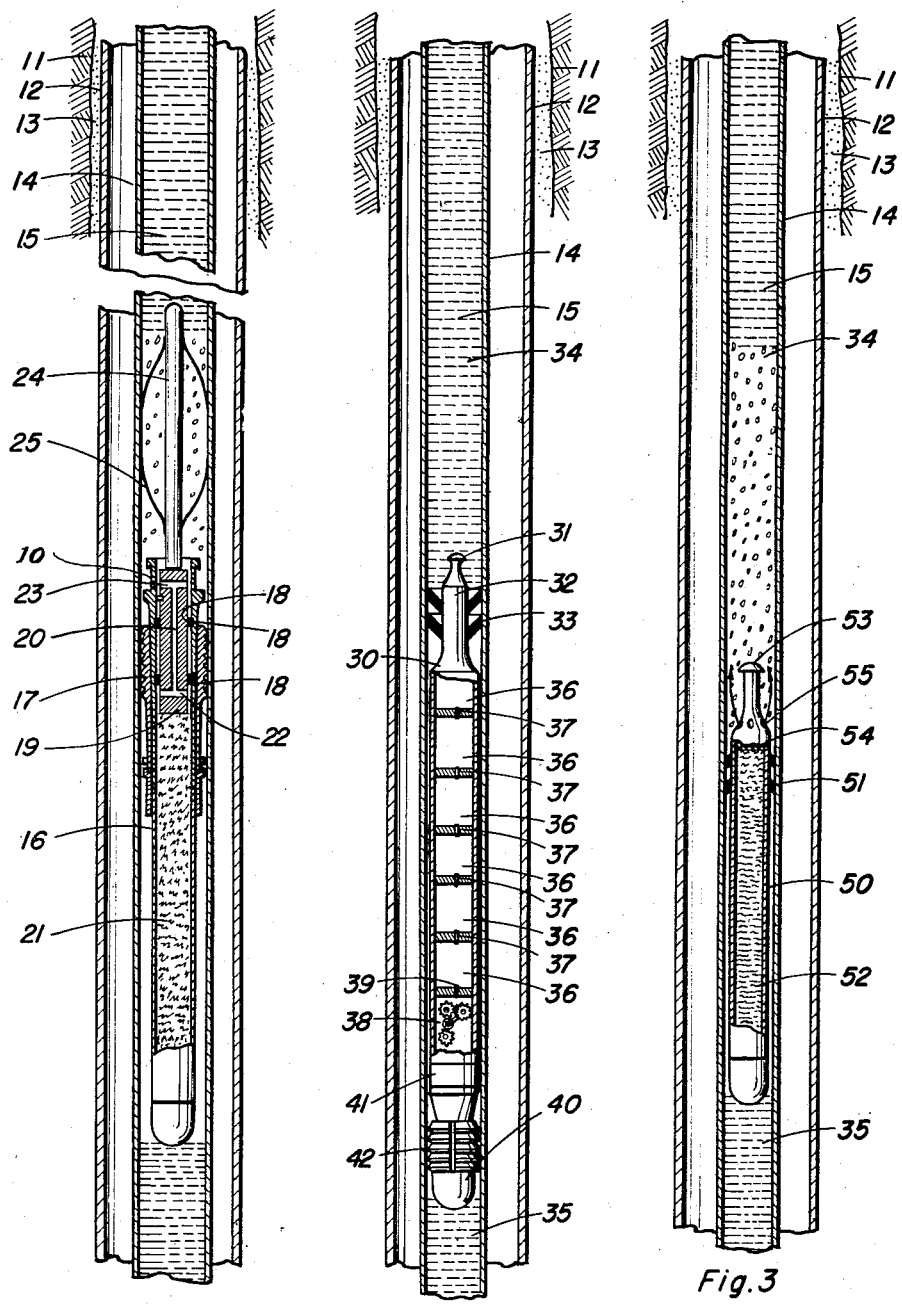

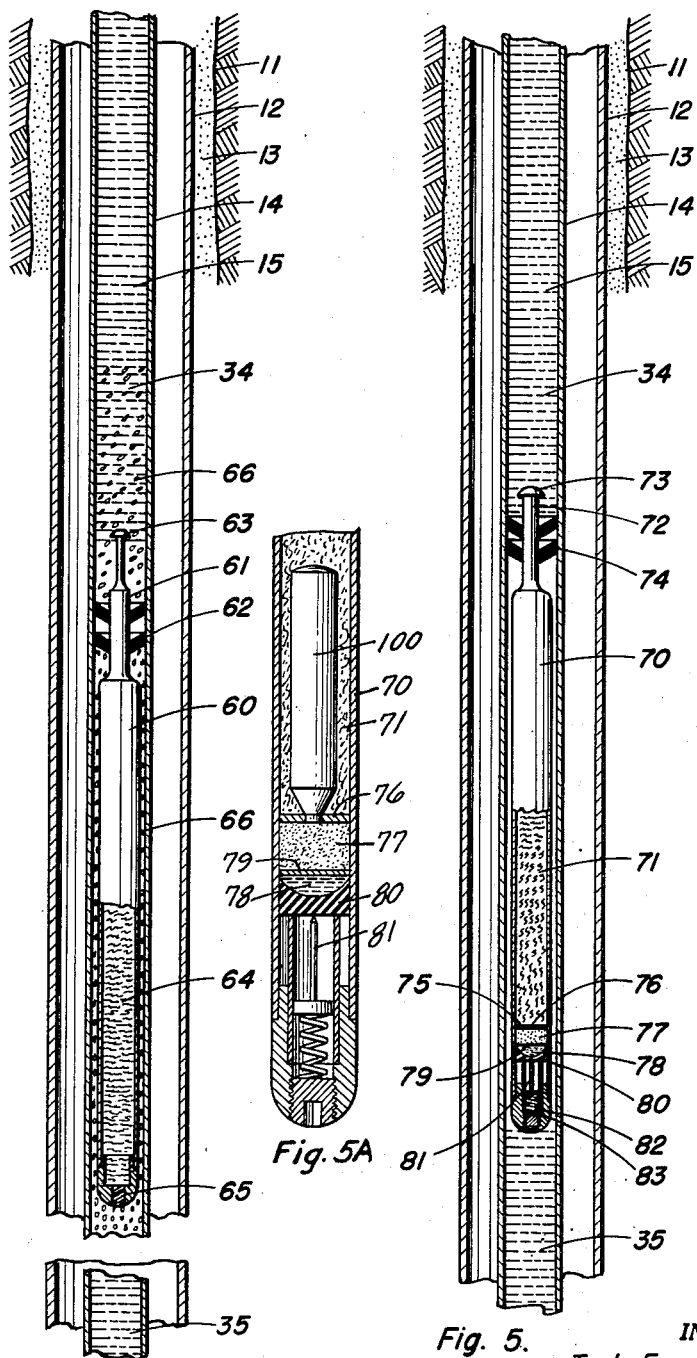

2,804,150

APPARATUS FOR REMOVAL OF FLUID FROM WELL BORES

T. J. Fuson, Houston, Tex., assignor, by mesne assignments, to Esso Research and Engineering Company, Elizabeth, N. J., a corporation of Delaware Application July 9, 1954, Serial No. 442,223

11 Claims. (Cl. 166—63)

The present invention is directed to a method for removing fluid from a well bore. More particularly, the invention is directed to a method for providing an artificial lift in a well where insufficient pressure is available to flow fluids from the well. In its more specific aspects, the invention is directed to a method for producing hydrocarbon and the like from wells in which fluid pressure is insufficient to lift the hydrocarbons.

The present invention may be briefly described as a method for removing fluids, such as hydrocarbons, from a well bore which comprises introducing a body of a gas-producing material into a substantially static column of liquid in the well at a level a substantial distance below the earth's surface. Gas is released from the body of gas-producing material at a selected level in the well and at least a portion of the column of liquid is thereby aerated and/or propelled to the earth's surface by the released gas.

In the practice of the present invention, it is contemplated that a body of gas-producing material will be lowered to a selected level in the well or placed at a selected level in the well such that the gas may be released to propel a column of liquid in the well to the earth's surface. The gas may propel the column of liquid to the earth's surface by aeration, such that the column is lightened by the rising gas and flowed to the surface by the pressure from below. In another way, the released gas may propel the column of liquid to the earth's surface by raising or lifting the column such as by forcing a member or plug up the well bore providing a piston effect which serves to lift the column of liquid to the earth's surface.

It is contemplated that any gas-producing material may be used, among which may be compressed gas and compressed hydrocarbon; explosives, such as gunpowder or nitro-compounds (nitro-glycerine or trinitro toluene); gas producing ingredients which react to release gas, such as calcium carbide, sodium, potassium, solid carbon dioxide and sodium bicarbonate and acids, such as hydrochloric acid, and the like. The calcium carbide may be reacted with water to release acetylene, whereas sodium and potassium may be similarly reacted with water to decompose same and release hydrogen.

The gas-producing material may be lowered, introduced or placed in the well in a capsule or reservoir or body member such that the gas may be released by operation from the surface at a predetermined or selected depth in the wall. Thus, for example, a capsule or container may be crushed or collapsed by mechanical impact, such as by a go-devil dropped from the earth's surface, or by a hammer or ram in the chamber or capsule containing the gas releasing material which is activated either by a clock-timed control or hydrostatic or pressure control mechanism. In a similar manner the well temperatures may be employed to release the gas from the gas-producing material or body. Chemicals may be provided in the chamber enclosing the gas-producing materials to rupture a wall to release the chemicals into contact with the gas-producing material. Thus the present invention is susceptible to many variations to allow the practice thereof.

The invention will be further illustrated by reference to the drawing in which—

Fig. 1 illustrates apparatus by way of which compressed gas may be released at a selected level in the well;

Fig. 2 illustrates a device by way of which gas may be generated at a selected level in the well and released to raise the liquid column;

Fig. 3 shows apparatus for generating gas to aerate the column of liquid;

Fig. 4 illustrates the generation of gas by reaction of a chemical to release gas to aerate and lift the column; and Fig. 5 illustrates the action of an acid or solvent to cause the release of a body of compressed hydrocarbons to generate gas.

Fig. 5A shows the embodiment of Fig. 5 including a source of oxygen to aid the combustion of the compressed hydrocarbons.

Referring now to the drawing in which identical numerals will be employed to designate identical parts, numeral 11 designates a well bore drilled from the earth's surface, not shown, to a producing stratum, formation, or interval, also not shown. Arranged in the well bore 11 is a casing 12 which has been perforated in the producing interval, not shown, to allow entry of fluids into the casing 12. The casing 12 has been cemented in place with primary cement 13 as is conventional to the art. Arranged in the casing 12 is a well tubing 14 which extends from the earth's surface to a level in the well at least above the producing interval or stratum from which hydrocarbons are obtained. A column of well fluids, such as hydrocarbons, 15 has risen in the well from the producing interval, not shown, but the differential pressure from the producing interval from the well casing 12 is insufficient to lift the column 15 to the earth's surface and the column 15 is substantially static.

In Fig. 1 a body member, such as 16, containing a compressed gas, such as methane, and the like, under pressure has been introduced initially into the well at a level, say at a point from about 1000 feet to 2000 feet. Repeated settings of the device may be required at various levels lower in the wellbore to reduce the static column sufficiently to permit natural flow. In this particular instance, the body member 16 containing compressed gas is run to the desired depth in the well and then held in place by means of holding slips 17 which may be conveniently set by a wire line. Such slips are clearly presented in the literature, for example, in the Composite Catalogue illustration of the Otis lower tubing stop in conjunction with another tool on page 4074 of the 19th 1952–53 edition. Suitable packing means, such as packing rings 18, are provided to maintain a seal in the upper section of the body member 16 in which is arranged a slidable member 19 provided with one or more longitudinal passageways 20 which communicate with the compressed gas 21 in the body member 16 by means of ports 22 and which may be released up the column through ports 23 as will be described. Slidable member 19 is held in body 16 by means of a shear pin such as 10.

When it is desired to release the gas 21 from the body member 16, a weighted go-devil, such as 24, is allowed to drop down the tubing 14. The weighted go-devil is provided with guide springs 25 for centering the go-devil and to allow it to drop on the section 19 shearing pin 10 and release the gas to aerate the column 15. As the weighted go-devil hits the section 19, it causes the section 19 to move downwardly forcing ports 22 below the lower-most packing ring 18 and brings the ports 22 and 23 into communication with the compressed gas 21 and allows the same to flow through passageway 20 upwardly in the well, as shown, to aerate the column 15 and allow same to be moved upward in the well. After the compressed gas 21 has been released down to well pressure, the body member 16 may be retrieved by use of a wire line provided with an engaging means and the body member 16 would be removed from the well. The operation may then be repeated at a lower level if required; however, once the column has been lightened to provide a differential pressure from the producing interval into the well casing, flow may be continued by the differential pressure.

Turning now to Fig. 2, another mode of practicing the invention is illustrated in which a body member 30 is gravitated into the well utilizing, if necessary, weighted bars (not shown) calculated to provide a known rate of descent. The upper section 32 of the body member 30 is reduced in size and is provided with swab-type cups or sealing members 33 which isolate the upper portion 34 of the column 15 from the lower portion of the column 35. In this particular instance, the body member 30 is provided with a plurality of powder compartments 36 which may contain an explosive of the type mentioned before and which are separated by fuse-type connections 37 which serve to cause a chain of explosions or burning of the powder or explosive to generate gas. A clockwork mechanism 38 activates a detonator 39 which initiates the explosion or firing and causes the reaction chain to proceed to the upper powder compartments.

The lower portion of the body member 30 defines a retaining plug 40 which is held to the upper portion of the body member 30 by frangible means 41. The retaining plug 40 is provided with slips, such as 42, to engage with the inner wall of the tubing 14. After the body member 30 gravitates in the tubing 14 to an approximately predetermined level, the clockwork mechanism 38 activates the detonator 39 and the lower-most of the fuses 37 and causes detonation or firing of the explosive in the lowermost of the compartments 36. This causes the frangible connection 41 to be ruptured and propels the upper section of the body member 30 upward through the tubing propelling the upper part 34 of the column 15 along with it serving as a piston by virtue of the swab cup 33. This induces a pressure differential from the formation into the wellbore and the retaining plug 40 after the member 30 has travelled upwardly in the well is either retrieved by a wire line engagement with the fishing neck 31 or released by the pressure of the well fluids flowing into the lower portion 35 of the column 15. The explosive or powder in compartments 36 may be sized and designed to allow gas to be generated over a period of time and released as the member 30 travels up the well. For example, gas may be released for a period ranging from instantaneously to quite an extended period depending on the number of chambers and the time settings of the connecting fuses.

Referring now to Fig. 3, a body member 50 provided with downwardly facing swab cups 51 encloses a solid body of carbon dioxide 52. The body member 50 is allowed to gravitate through the tubing 14 to a selected level during which time the solid carbon dioxide is retained in the body member 50 by pressure sensitive membrane 54 which suitably may be a metallic rupture-type diaphragm or an assembly which contracts under applied pressure to open a passageway. Ports 55 allow communication between the interior of the body member 50 and the column 15 of the well fluids. Like in Fig. 2, it is to be noted that the swab cup or sealing members 51 isolate the upper portion 34 from the lower portion 35 of the column 15 of well fluids. When the body member 50 has reached a selected approximate level in the well, the pressure sensitive membrane 54 will be ruptured by the effect of the hydrostatic column of well fluids or the warming up of the solid carbon dioxide causes sublimation thereof and generation of the gaseous carbon dioxide may cause the pressure sensitive membrane to be ruptured allowing the gas to be released as shown in Fig. 3 to aerate the upper section 34 of the column of well fluids and to cause same to travel upwardly to the earth's surface.

By virtue of the arrangement of the swab cups 51 and by virtue of the sublimation of the solid carbon dioxide to lighten the column 34 and the body member 50, the well fluids in the column 15 having a differential pressure into the well may then cause the body member 50 to travel slowly up the tubing 14 to the earth's surface where it may be caused to move into a conventional lubricator for retrieving same from the tubing. If desired, however, the body member 53 might be re-engaged with a wire line fishing tool to retrieve same from the well.

In Fig. 4 a body member 60 is provided which has an upper portion 61 of reduced cross-sectional dimensions and is provided with swab cups or sealing members 62. This device, likewise, is gravitated into the tubing to approximately the selected depth. Arranged in the body member 60 is a mass 64 of solid calcium carbide or other reactable chemicals, such as sodium or potassium. The body of calcium carbide and the like is retained in the body member 60 by means of a low melting point wax plug, such as 65, which is designed to melt at well temperature at the selected interval.

The mode of operation described with respect to Fig. 4 is particularly useful when the well fluids contain or comprise a substantial amount of water. In this instance, it may be assumed that the well fluids are at least saturated with water and when the plug 65 has melted, due to reaching the well temperature, the calcium carbide and the like will come into contact with water which will cause generation of gas, such as acetylene, which is released in the lower portion 35 of the column 15. By virtue of the swab cup being designed to pass gas upwardly, the bubbles 66 of gas travelling upwardly between the body member 60 and the tubing 14 and thence past the swab cups 62 will serve to aerate the upper section 34 of the column 15 allowing same to be propelled to the earth's surface. Thus the well fluids are artificially lifted and a differential pressure caused to exist from the producing interval into the well casing. Besides aeration, as illustrated, the swab cups 62 are so arranged that the body member 60 is also moved to the earth's surface by the generation of gas, such as acetylene, or may be recovered using wire line engagement with the fishing neck 63.

Referring now to Fig. 5, a body member, such as 70, suitably encloses a body of compressed hydrocarbons 71 which suitably may be liquefied, normally gaseous hydrocarbons, such as propane or butane. The upper section 72 of the body member 71 is reduced in cross-sectional dimensions and is provided on its upper end with a fishing neck 73. The swab cups or sealing members 74 isolate the upper section 34 of the column 15 from the lower section 35. It is understood, of course, that the body member 70 may suitably be lowered in the well or placed therein by means of a wire line or it may be allowed to travel downwardly in the well by free fall.

In the event the body member 70 is placed at a selected interval, it may be desired to burn the compressed hydrocarbons to form combustion gases as will be described further. Arranged in the body member 70 is a plate member 75 which defines a sized orifice 76. Below the orifice 76 is an igniter chamber 77 which suitably may contain an ignition means, such as sodium in kerosene solution, which is separated from a solvent or acid 78 which suitably may be hydrochloric acid by a wall member 79. The acid or solvent is confined by a membrane 80 which is soluble in the solvent. Below the membrane 80 is an igniter pin 81 which is biased upwardly against the membrane 80 by means of a biasing means, such as a spring 82 confined in a tubular member 83.

The membrane 80 may be of sized thickness to achieve a timed effect. As it is corroded by the acid or solvent, the spring actuated ignition pin 81 moves to pierce the wall member 79 to drain kerosene from the igniter 77 to permit spontaneous combustion of the sodium material and to further pierce the cover (not indicated by number) of the orifice 76. The heat of combustion may be used to ignite the hydrocarbons as they pass from the compressed state 71 through the orifice 76. The energy of the resulting products of combustion moves the tool 70 and the material before it up the tubing 14.

In this latter embodiment, it may be desirable to provide a source of oxygen to obtain combustion of the compressed hydrocarbons such as shown in Fig. 5A. Such may suitably be done by arranging an auxiliary chamber 100 of compressed oxygen which discharge may be controlled to the point of combustion to provide the oxygen for the operation.

It may be desirable under some circumstances with respect to Fig. 5 to allow the energy contained in the compressed hydrocarbons to provide the propelling energy without igniting same. For example, liquefied natural gas may be released from a chamber, such as 70, to propel the body member 70 by a jetting action up the tubing 14.

The method of the present invention has considerable utility in that artificial lifting of well fluids is possible without requiring the use of heavy duty lifting equipment. Likewise, the invention is of considerable utility in the permanent well completion technique where the tubing is fixed permanently in the well above the uppermost of a plurality of hydrocarbon productive intervals and all operations of completion and servicing are conducted through the tubing. Also the invention is of considerable utility where it is not deemed desirable to provide gas lift equipment or where gas is not available for such gas lifting. The invention is, therefore, useful and advantageous in the industry.

The nature and objects of the present invention having been completely described and illustrated what I wish to claim as new and useful and to secure by Letters Patent is:

1. Apparatus for removing fluid from a well having a casing with a well tubing arranged therein which comprises, an elongated body member containing a body of gas producing material, said elongated body member being adapted to be placed at a particular level in said well tubing, sealing means carried by said elongated body member for sealing with the inner wall of said well tubing, and gas releasing means arranged in said elongated body member in proximity to said body of gas producing material for fluidly communicating said body of gas producing material through a port in said elongated body member with a substantially static column of well liquid in said tubing, said gas releasing means being adapted to release gas controllably from said gas producing material into said column of well liquid at a level above said sealing means and thereby propel at least a portion of said well liquid to the earth's surface.

2. Apparatus in accordance with claim 1 in which the body of gas producing material is an explosive and said gas releasing means comprises a detonator for said explosive.

3. Apparatus in accordance with claim 1 in which the body of gas producing material is solid carbon dioxide and said gas releasing means comprises a pressure sensitive member.

4. Apparatus in accordance with claim 1 in which the body of gas producing material is calcium carbide and the gas releasing means is a low melting point plug.

5. Apparatus in accordance with claim 1 in which the body of gas producing material is liquefied normally gaseous hydrocarbons and the gas releasing means comprises means for igniting the hydrocarbons.

6. Apparatus in accordance with claim 1 in which the sealing means resists flow downwardly in said tubing past said elongated body but allows flow upwardly in said tubing past said elongated body and in which said port and said gas releasing means are arranged below said sealing means.

7. Apparatus in accordance with claim 1 in which the port is arranged above said sealing means and said gas releasing means is a valve openable by a weight imposed thereon.

8. Apparatus in accordance in claim 1 in which the port is arranged above said sealing means.

9. Apparatus in accordance with claim 1 in which the elongated body member is formed into an upper section and a lower section interconnected by a frangible connection means, said sealing means being arranged on the upper section, said gas releasing means releasing gas below said upper section to break said frangible means and thereby propel said upper section upwardly in the well, said upper section carrying therewith at least a portion of said column of well liquid.

10. Apparatus in accordance with claim 1 in which the elongated body member is provided with means on its upper end for retrieving said elongated body member from the well tubing.

11. Apparatus in accordance with claim 1 in which the elongated body member is provided with pipe engaging means for maintaining said elongated body member at said particular level above the bottom of said well while the gas is being released.

References Cited in the file of this patent

UNITED STATES PATENTS

| | | |
|---|---|---|
| 1,152,734 | Jones | Sept. 7, 1915 |
| 1,843,002 | Small | Jan. 26, 1932 |
| 1,856,912 | Grebe et al. | May 3, 1932 |
| 2,018,205 | Evans | Oct. 22, 1935 |
| 2,228,629 | Jarrell | Jan. 14, 1941 |
| 2,361,558 | Mason | Oct. 31, 1941 |
| 2,712,355 | Hoff | July 5, 1955 |
| 2,740,478 | Greene | Apr. 3, 1956 |
| 2,749,990 | Carpenter | June 12, 1956 |

OTHER REFERENCES

Uren: Petroleum Production Engineering, Exploitation, published by McGraw-Hill, New York, 1939, pages 93 to 96 and 110.